United States Patent [19]

Yamazaki

[11] 4,339,186
[45] Jul. 13, 1982

[54] AUTOMATIC DIAPHRAGM CONTROL AND MIRROR RELEASE DEVICES FOR CAMERAS

[75] Inventor: Keiji Yamazaki, Sakai, Japan

[73] Assignee: Minolta Camera Kabushiki Kaisha, Osaka, Japan

[21] Appl. No.: 259,764

[22] Filed: May 1, 1981

[30] Foreign Application Priority Data

May 2, 1980 [JP] Japan .................................. 55-57798

[51] Int. Cl.³ ........................................... G03B 7/095
[52] U.S. Cl. ...................................... 354/38; 354/43; 354/152
[58] Field of Search ................... 354/29, 30, 23 D, 36, 354/38, 43, 44, 60 R, 152, 266, 268, 27

[56] References Cited

U.S. PATENT DOCUMENTS

3,777,637 12/1973 Kuramoto et al. .
3,896,472 7/1975 Yoshiyama ............................ 354/38
3,922,693 11/1975 Matsui .
4,142,787 3/1979 Ueda et al. .
4,264,159 4/1981 Ueda et al. .

Primary Examiner—L. T. Hix
Assistant Examiner—William B. Perkey
Attorney, Agent, or Firm—Watson, Cole, Grindle & Watson

[57] ABSTRACT

In a camera automatic diaphragm control device of the type wherein scene light is measured through the diaphragm aperture during the stopping-down operation thereof, which is arrested when the measured light value reaches a given level with respect to manually set exposure parameters, thereby determining the diaphragm aperture, structure is provided for positively ensuring that the diaphragm aperture is left fully open when the set exposure parameters and the measured light require such diaphragm aperture setting. The diaphragm aperture control device is employed in a single lens reflex camera with a reflex mirror retractable from a viewing position at selected times in dependence on whether the diaphragm aperture remains fully open or is reduced.

10 Claims, 9 Drawing Figures

AUTOMATIC DIAPHRAGM CONTROL AND MIRROR RELEASE DEVICES FOR CAMERAS

BACKGROUND OF THE INVENTION

1. Field of the Invention

The present invention relates to diaphragm control devices for cameras, and in particular to such diaphragm control devices in which scene light is measured through a diaphragm aperture in the process of being stopped-down and wherein the diaphragm closing operation is terminated in response to a control signal representing that the measured light intensity has attained a reference level established as a function of photographic exposure parameters such as shutter speed and film speed.

The invention has particular application to mirror release mechanisms used in conjunction with the above type of diaphragm control devices in single lens reflex cameras, and in particular to the above combination of mirror release mechanisms and diaphragm aperture control devices for selected timing release of the reflex mirror subsequent to aperture determination dependent upon whether the diaphragm is to be fully open or reduced.

2. Description of the Prior Art

In diaphragm control devices of the aforementioned type, it is desired that the diaphragm aperture is left fully open when the measured light intensity is equal to or exceeds an established reference level before the diaphragm stopping-down operation is actuated. However, it has been difficult for prior art camera diaphragm control devices to provide such a fully open diaphragm aperture in such cases. This is assumed to be due to the fact that a slight time lag is unavoidable from the generation of the control signal for actually arresting the diaphragm, such that the diaphragm is stopped-down a little further than is necessary during the aforementioned time lag. Additionally, the mechanical play among, and/or between, the various mechanical linkages from the diaphragm stopping-down control electromagnet to a diaphragm arresting member varies with individual devices. Also, the magnetic force required for pressing the armature of the electromagnet to its pole, for example, also varies from one to another of individual electromagnet mechanisms.

SUMMARY OF THE INVENTION

Accordingly, a primary object of the present invention is to provide an improved camera diaphragm control device of the above-mentioned type but affording a fully open aperture when required.

Another object of the present invention is to provide a diaphragm control device wherein the diaphragm aperture is left fully open when the light intensity received and measured through the fully open diaphragm aperture is equal to or lower than a given reference level.

A further object of the invention is to provide camera exposure control devices affording accurate control over diaphragm aperture determination in cameras of the type specified herein.

Still another object of the invention is to provide improved camera exposure control devices as in the above object in which the release of a reflex mirror in a single lens reflex camera is also accurately controlled and effected subsequent to the aperture determination.

Yet another object of the invention is to provide camera exposure control devices affording accurate control over diaphragm aperture determination and, in combination therewith, release of the mirror in a single lens reflex camera at selected times subsequent to such aperture determination dependent upon whether the diaphragm is to remain fully open or is to be reduced.

Another object of the invention is to eliminate, or significantly reduce, the deleterious effects of mechanical and electrical inaccuracy in prior art diaphragm aperture control devices and mirror release mechanisms for cameras of the type specified herein.

Yet another object of the invention, commensurate with that immediately above, is to further eliminate, or significantly reduce, the deleterious effects of mechanical and electrical inaccuracies in the release of the reflex mirror subsequent to aperture determination.

Another object of the invention is to provide in cameras of the type specified herein accurate diaphragm aperture determination and release of a reflex mirror at selected times subsequent to aperture determination in response to camera shutter release operation.

Yet a further object of the invention is to provide automatic selection of time delay for the release of the mirror in a single lens reflex camera of the type specified herein subsequent to aperture determination.

A still further object of the invention is to provide accurate control over diaphragm aperture determination and release of the reflex mirror in a single lens reflex camera subsequent to such aperture determination.

According to one embodiment of the present invention diaphragm aperture control mechanism includes a release interlock mechanism actuated by a first electromagnetic device controlled by a light measuring circuit to release a second interlock lever enabling movement of a diaphragm interlocking pin to stop-down the diaphragm. The diaphragm interlocking pin engages a control lever actuated by a first interlock lever which is pivotally interconnected to the aforementioned second interlock lever to latch the entire diaphragm exposure control mechanism in a charged position. The second interlock lever also includes an arm engageable with a reset mechanism to return the diaphragm aperture control mechanism to an initial charged condition. A pawl is engageable with a gear mechanism for delaying and stopping the rotation thereof for determining the aperture, and is actuated by a stop lever moved by energization of a second electromagnetic device responsive to a control signal. Adjustment in the release interlock mechanism and diaphragm aperture stopping mechanism enables minimization of the time lag caused by the operation of the diaphragm exposure control mechanism.

Mirror release is initiated by a third electromagnetic device actuating a mirror actuating lever which releases a mirror drive lever to retract the reflex mirror from a viewing position into a photographic position. A mirror reset lever is engageable with the mirror actuating lever and the reset lever is actuated by an exposure termination signal to move the aforementioned second interlock lever into a position to reset the mirror mechanism. In a modified embodiment, the mirror release and reset mechanism utilizes a mechanical governor or retarding mechanism for delaying the mirror release or retracting operation.

According to the aforementioned embodiment of the invention, the diaphragm control device is employed in a single lens reflex camera wherein the objective lens is interchangeable and the reflex mirror is retracted from the optical light path at a time selected in conjunction with the diaphragm aperture determination. In another embodiment, the reflex mirror is actuated after a lapse of a predetermined delay time measured from the instant of the camera release operation. In a further embodiment, the mirror retraction starts immediately after camera release operation when the diaphragm aperture is to be left fully open. In yet another embodiment, the actuation of the reflex mirror is delayed a short time after arrestment of the diaphragm, when the diaphragm aperture has been reduced.

BRIEF DESCRIPTION OF THE DRAWINGS

The above and other objects, advantages, features, and applications of the invention will become more apparent with the following description of preferred embodiments representing the best mode of carrying out the invention when considered in conjunction with the accompanying drawings in which.

DETAILED DESCRIPTION OF THE PREFERRED EMBODIMENTS

Figure 1:
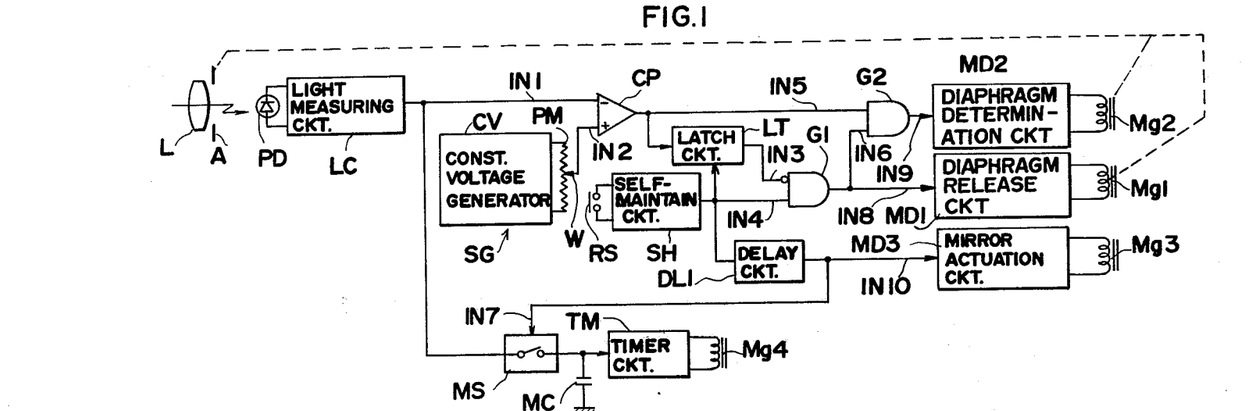
FIGS. 1 through 3 are circuit block diagrams of respective embodiments of part of the invention.

With reference to FIG. 1, light measuring circuit LC includes photocell PD for receiving scene light through camera objective lens L and diaphragm aperture A to produce a voltage signal proportional to the intensity of the scene light. Light measuring circuit LC further includes an exposure calculation circuit which performs calculations in a manner known to those skilled in the camera art using the aforementioned voltage signal and a signal commensurate with film sensitivity to generate an output voltage representative of an exposure time determined by three exposure parameters, i.e., the scene light intensity or scene brightness, diaphragm aperture A and the film sensitivity. The output voltage of light measuring circuit LC has a linear relationship with the logarithm of the scene brightness, wherein the higher the output voltage, the higher the scene brightness.

Potentiometer PM is arranged such that slider W may be manually set to a position commensurate with a shutter speed (an exposure time) value. Both potentiometer PM and constant-voltage circuit CV constitute shutter speed signal generator SG which provides, from slider W, a voltage signal output indicative of the set shutter speed. Voltage comparator CP compares the output voltage level signals from light measuring circuit LC and shutter speed signal generator SG, and produces a "low" (logic "0") level voltage when the voltage of light measuring circuit LC is higher than the voltage of shutter speed signal generator SG, and a "high" (logic "1") level voltage when the voltage of shutter speed signal generator SG is higher than the voltage of light measuring circuit LC. The expressions logic "0" and logic "1" are used in the above sense throughout this specification.

The output of voltage comparator CP is connected to the input of latch circuit LT and one input of two-input AND gate G2. Release switch RS is closed when a multi-stage depressible shutter button (not shown) is depressed into a second stage. It should be noted that, with the shutter button depressed into a first stage, a power switch (not shown) is closed to actuate the circuitry of FIG. 1 so that an indicating circuit (not shown) displays the anticipated aperture value based on the output signals from light measuring circuit LC and shutter speed signal generator SG. Self-maintaining circuit SH produces a logic "1" signal in response to the closure of release switch RS and maintains the generation of the logic "1" signal until the shutter is closed. It is to be understood that the self-maintaining circuit SH is released by a signal generated in conjunction with the shutter closing operation. The output of self-maintaining circuit SH is respectively connected to the latch input of latch circuit LT, input IN4 of two-input AND gate G1 and the input of delay circuit DL1. While self-maintaining circuit SH outputs the logic "1" signal, latch circuit LT retains the output signal generated by voltage comparator CP at the time when release switch RS is closed, and applies that output signal to inverted input IN3 of AND gate G1.

Delay circuit DL1 starts time counting in response to the inverted output of self-maintaining circuit SH from a logic "0" to a "1" level, which occurs in response to the closure of release switch RS, and generates an output logic "1" after the lapse of a predetermined period of time, e.g., 30 m-sec. The delay time produced by delay circuit DL1 is designed to sufficiently cover the longest period of time required for the diaphragm of the exchangeable lens used in the camera to be stopped-down from its fully open aperture to the minimum aperture for carrying out diaphragm aperture control. The output of delay circuit DL1 is respectively connected to the input of mirror actuation circuit MD3 and control input IN7 of memory switch MS. Memory switch MS is an analog switch known to those skilled in the camera art and comprising semiconductor elements, and is closed when a logic "1" signal is applied to control input IN7. Therefore, when delay circuit DL1 generates a logic "1", light measuring circuit LC and storage or memory capacitor MC are disconnected from one another, whereby memory capacitor MC stores the output signal of light measuring circuit LC at the time of disconnection. Timing circuit TM begins a timing operation with the start of exposure and de-energizes electromagnet coil Mg4 in a well-known manner for closing the shutter after a lapse of time commensurate with the voltage stored in memory capacitor MC.

Figure 2:
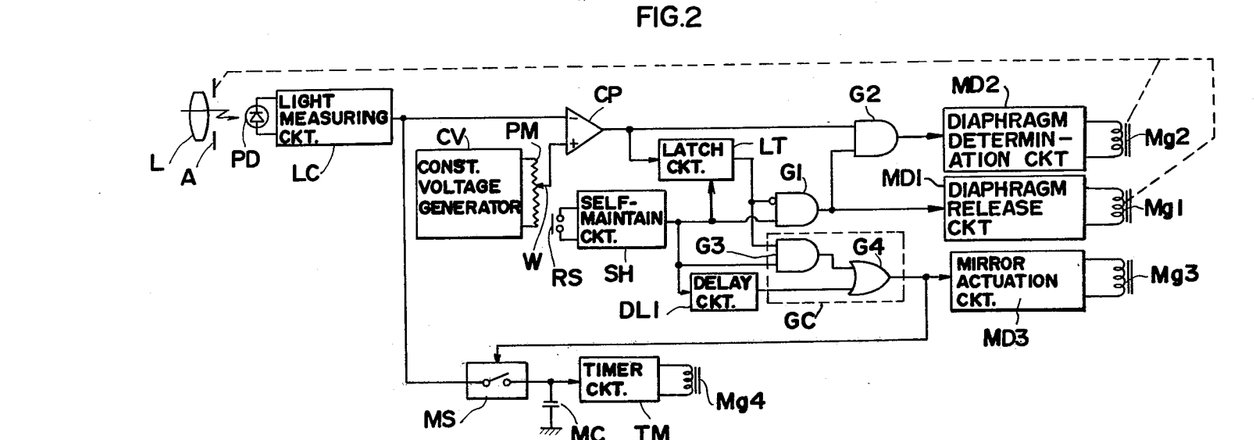
Figure 3:
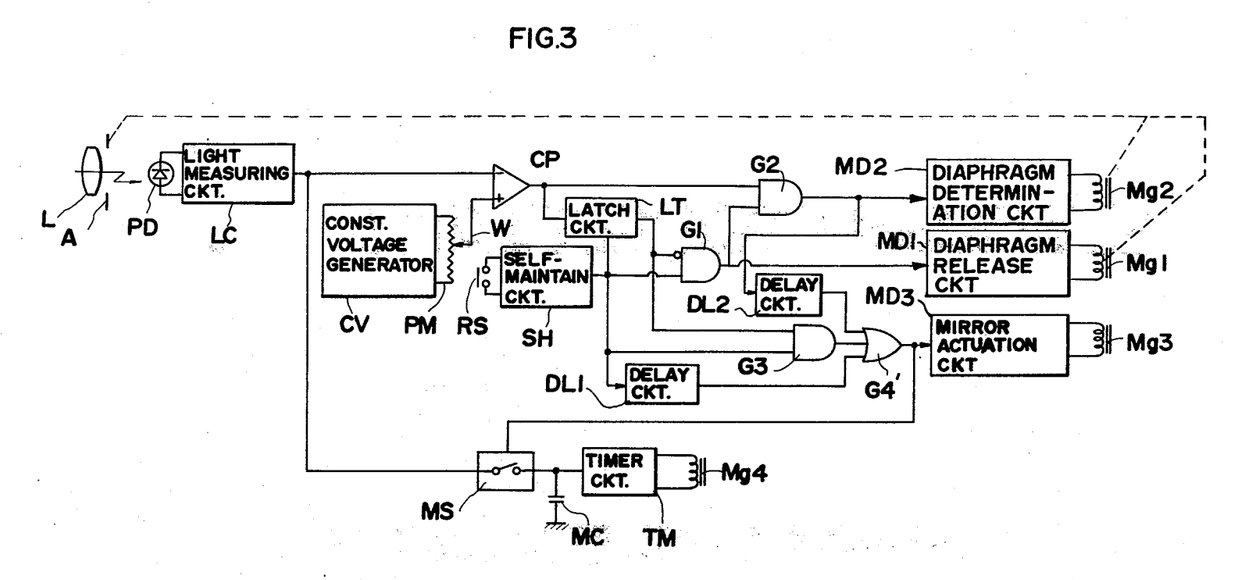

Electromagnet coil Mg1 is adapted for actuating a diaphragm aperture control system, and electromagnet coil Mg2 is adapted for interrupting the stopping-down operation of the diaphragm. Electromagnet coil Mg3 is adapted for actuating a reflex mirror system for the retirement of the reflex mirror from the camera photographic light path. In FIGS. 1 to 3 (inclusive) only the coils of the electromagnets are shown as symbolic representations of the actual electromagnet device. Electromagnet drive circuits MD1, MD2 and MD3, upon receipt of a logic "1" input, energize electromagnet coils Mg1, Mg2 and Mg3, respectively connected thereto, to counteract the magnetic force produced by the permanent magnets of the associated electromagnetic devices. At this moment, the respective armatures of the respective electromagnetic devices are freed from their attracted conditions by the resulting spring biases applied thereto, thereby allowing the above operations.

The following is a description of the operation of the circuitry shown in FIG. 1. It is assumed that the film in the camera is wound up and that the shutter button is at a first stage of depression. With these conditions, diaphragm aperture A is fully opened, and light measuring circuit LC generates a voltage signal indicative of a suitable shutter speed for the measured scene brightness, set film sensitivity and the fully open diaphragm aperture. For purposes of description only, it is further assumed that the shutter speed represented by the light measurement circuit voltage signal output is 1/2000 second, and the manually set shutter speed is 1/125 second. Since, in this case, the IN1 input voltage level is higher by four steps than that at input IN2, voltage comparator CP generates a logic "0" signal. With the above assumed conditions, when the shutter button is further depressed to close release switch RS, latch circuit LT latches and holds the logic "0" output from voltage comparator CP, whereby AND gate G1 is unblocked. Therefore, the logic "1" signal from self-maintaining circuit SH passes through AND gate G1 as input IN6 of AND gate G2 and input IN8 of diaphragm release circuit MD1. Thus, electromagnet coil Mg1 actuates the diaphragm aperture control mechanism (not shown) immediately after the closure of release switch RS, thereby initiating the stopping-down operation of diaphragm aperture A. At the same time, delay circuit DL1 starts a delaying operation. While diaphragm aperture A is being stopped-down, light measuring circuit LC continues light measurement to continuously generate a signal indicative of a suitable shutter speed for the diaphragm aperture during the stopping-down operation. When diaphragm aperture A is stopped-down to a size such that the output level of light measuring circuit LC becomes lower than the signal level at slider W for the manually set shutter speed of 1/125 second, the output of voltage comparator CP is inverted to logic "1". The logic "1" signal is applied through AND gate G2 to diaphragm determination circuit MD2 and actuates electromagnet coil Mg2 to interrupt the stopping-down operation of diaphragm aperture A. Thus, diaphragm aperture A is determined to a size which provides the shutter speed of 1/125 second.

Delay circuit DL1 generates the logic "1" signal after the lapse of a predetermined delay time from the closure of release switch RS. Before the logic "1" signal is generated, the determination of diaphragm aperture A has been completed, and memory capacitor MC has been charged to a signal voltage indicative of that shutter speed suitable for the determined diaphragm aperture. The logic "1" signal from delay circuit DL1 opens memory switch MS and, at the same time, energizes electromagnet coil Mg3 to actuate a reflex mirror drive mechanism to be more fully described hereinafter, whereby the reflex mirror is retracted from the photographic optical path. Upon completion of mirror retraction, the shutter is opened to initiate exposure.

When the level of light measurement through the fully open aperture is lower than the set shutter speed signal level, the circuitry of FIG. 1 operates as follows. Solely for the purposes of describing such operation, it is assumed that the shutter speed is set at 1/125 second, and that the output voltage of light measuring circuit LC for the scene brightness measured through the fully open aperture corresponds to a shutter speed of 1/60 second. In such a case, voltage comparator CP generates a logic "1" output. When release switch RS is closed and a logic "1" signal is generated from self-maintaining circuit SH, latch circuit LT holds the signal from comparator CP in a similar manner to that previously described, but the signal output is a logic "1", and delay circuit DL1 initiates the delay operation. However, since the logic "1" signal from latch circuit LT is applied to inverting input IN3 of AND gate G1, the logic "1" signal from self-maintaining circuit SH is not gated through AND gate G1. Therefore, electromagnet coil Mg1 is not energized as release circuit MD1 in the diaphragm aperture control mechanism is not actuated. In this case, as no arresting of the diaphragm stopping-down operation is required, electromagnet coil Mg2 also remains inoperative as input IN6 of AND gate G2 is at a logic "0" level. Thus, diaphragm aperture A remains at the fully opened condition without being stopped-down, with a signal representative of a shutter speed suitable for the fully open aperture as well as the scene brightness measured therethrough.

A set film speed value is stored in memory capacitor MC by the opening of memory switch MS after the lapse of the delay time produced by delay circuit DL1, and the reflex mirror drive mechanism is also actuated to retract the reflex mirror (to be more fully described hereinafter). The same operation as described above is performed thereafter. Thus, the reflex mirror drive mechanism is actuated independently of the operation of the diaphragm aperture control mechanism. This is followed by the actuation of an exposure control mechanism. Thus, diaphragm aperture A is correctly controlled to its fully open aperture unlike conventional or prior known camera apparatus in which the diaphragm aperture is slightly stopped-down from the fully open aperture thereof when the diaphragm aperture should remain at the fully open aperture position.

FIG. 2 is a block circuit diaphragm showing a second embodiment of the present invention in which the same legends are used for components corresponding to those of FIG. 1. The circuitry of FIG. 2 differs from that of the FIG. 1 embodiment in that it includes gate circuit GC. With the circuitry of FIG. 1, the reflex mirror drive mechanism is released by the output of delay circuit DL1, whether the output of voltage comparator CP is a logic "0" or "1" before the closure of release switch RS. With the circuitry of FIG. 2, however, the reflex mirror drive mechanism is actuated immediately after the closure of release switch RS when the output of voltage comparator CP is a logic "1" before the closure of release switch RS, i.e., when diaphragm aperture A is fully open.

With reference to FIG. 2, the outputs of latch circuit LT and self-maintaining circuit SH are connected respectively to the inputs of two-input AND gate G3, and the respective outputs of two-input AND gate G3 and delay circuit DL1 are connected to a respective input of two-input OR gate G4. When the output of voltage comparator CP is a logic "0" before the closure of release switch RS, that logic "0" signal is applied through latch circuit LT to AND gate G3, which is blocked and remains blocked even after release switch RS is closed. In this case, therefore, the reflex mirror drive mechanism is actuated by an output signal from delay circuit DL1 through OR gate G4.

In contrast thereto, when the output of voltage comparator CP is a logic "1", AND gate G1 is blocked since the logic "1" signal retained by latch circuit LT is applied to the NOT input of AND gate G1, but AND gate G3 is unblocked by the same logic "1" signal. As a result, when release switch RS is closed, the logic "1" signal from self-maintaining circuit SH is immediately gated through AND gate G3 and OR gate G4 to mirror actuation circuit MD3 to excite electromagnet coil Mg3 and also input to memory switch MS. Thus, the reflex mirror drive mechanism is actuated earlier than that provided by the circuitry of FIG. 1, thereby overriding the delay time produced by delay circuit DL1. Commensurately, photographic exposure is also initiated earlier than in the case of the circuitry of FIG. 1 because of the earlier closure of memory switch MS.

FIG. 3 is a block diagram showing a third embodiment according to the present invention, wherein three-input OR gate G4' is used in place of two-input OR gate G4 in the circuitry of FIG. 2, and delay circuit DL2 is provided between one input of three-input OR gate G4' and the output of AND gate G2. In accordance with the circuit arrangement of FIG. 3, the reflex mirror drive mechanism is released in response to the logic "1" signal from delay circuit DL1 or DL2 that is generated earlier than the other, when diaphragm aperture A is stopped-down from the fully open condition to a determined aperture.

Now assume that the diaphragm aperture control mechanism is released in response to the closure of release switch RS, and that the output of voltage comparator CP is inverted from a logic "0" to "1" when diaphragm aperture A is stopped-down slightly from its fully open aperture position. AND gate G2 generates a logic "1" signal in response to that inversion, thereby arresting the stopping-down operation of the diaphragm. At the same time, delay circuit DL2 begins a delay operation to generate a logic "1" signal after the lapse of a predetermined delay time (e.g., 5 m-sec) which is smaller than the delay time of delay circuit DL1. If delay circuit DL1 has not generated a logic "1" output at this moment, the reflex mirror drive mechanism is actuated by the logic "1" signal from delay circuit DL2. Thus, the reflex mirror drive mechanism is actuated earlier than by the output of delay circuit DL1 in the circuitry of FIGS. 1 and 2.

The purpose of providing delay circuit DL2 is as follows. When the diaphragm stopping-down operation is arrested, diaphragm aperture A slightly vibrates or oscillates, from an increase or decrease of the aperture size thereof, for a short period of time before it comes to a standstill condition. Delay circuit DL2 serves to ensure that memory switch MS is opened after that vibration has completely stopped and the diaphragm aperture is fixed. It should be noted that when the camera exposure time control circuit is arranged to control the exposure time in accordance with the measurement of the scene light traversing the objective lens and the diaphragm aperture, and reflected from the first shutter curtain of a focal plane shutter and/or the film plane, delay circuit DL2 is unnecessary and the reflex mirror drive mechanism may be arranged such that it is released immediately in response to the inversion of the output of AND gate G2 from a logic "0" to "1".

Figure 4:
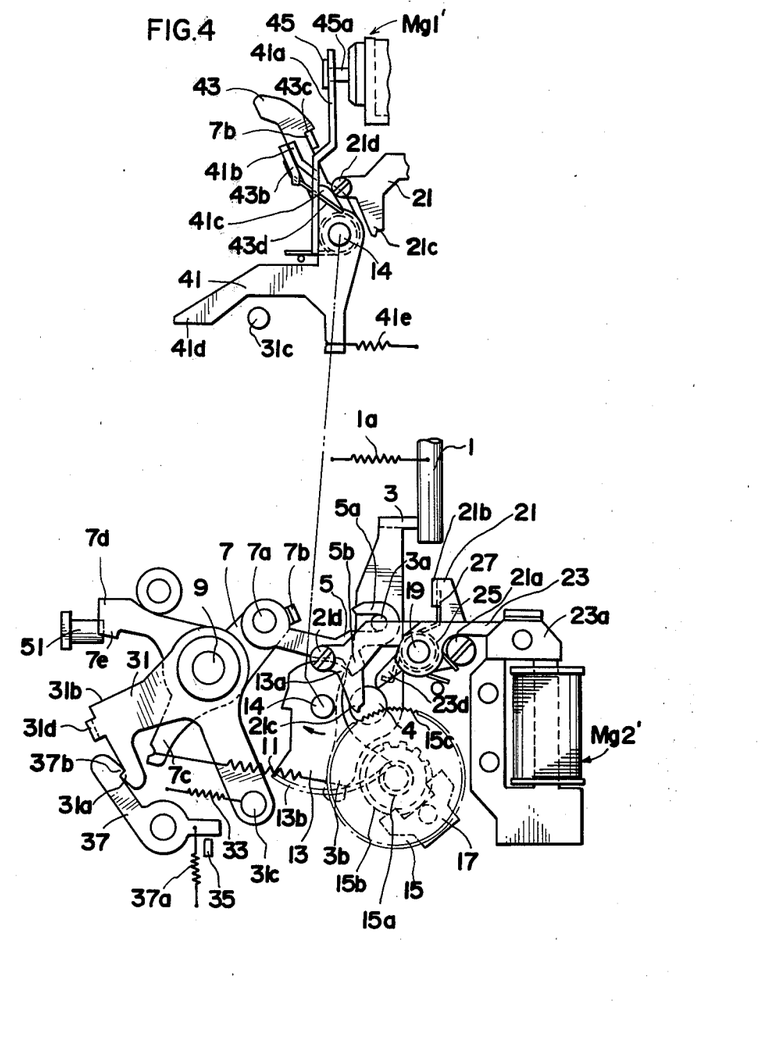
FIG. 4 is a partial exploded plan view of a diaphragm control mechanism according to a preferred embodiment thereof.
Figure 5:
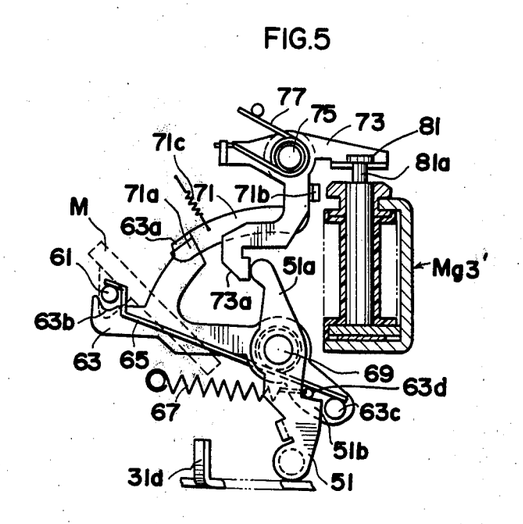
FIG. 5 is a partial cross-sectional plan view of a mirror driving mechanism according to an exemplary embodiment thereof.
Figure 6:
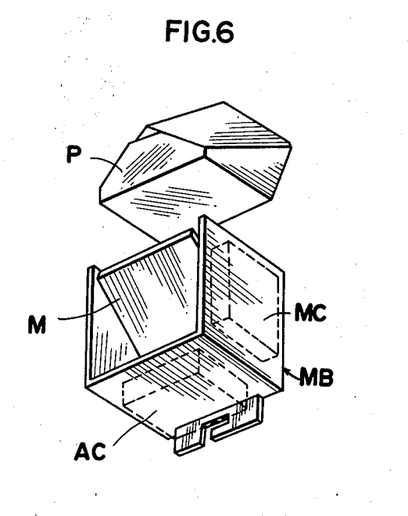
FIG. 6 is a schematic illustration showing the arrangement of the diaphragm control mechanism and the mirror driving mechanism with the mirror box of a single lens reflex camera.

FIG. 4 shows a preferred embodiment of the diaphragm aperture control mechanism itself that is used in conjunction with the previously described electrical diaphragm aperture control circuitry. FIG. 5 shows an exemplary embodiment of mirror actuating mechanism, and FIG. 6 illustrates an exemplary arrangement of the diaphragm aperture control mechanism and the mirror actuating mechanism inside the camera body, with the aforementioned components mounted on the mirror box of a single lens reflex camera. With reference to FIG. 6, diaphragm aperture control mechanism AC is disposed on the bottom under-wall of mirror box MB and mirror release mechanism MC is located on one side wall thereof. It should be understood that numeral P in FIG. 6 represents a pentagonal prism for the viewfinder.

With reference to the diaphragm aperture control mechanism AC shown in FIG. 4, diaphragm aperture control lever 3 is rotatably mounted on shaft 4 and continuously engaged by diaphragm interlocking pin 1, which is interlocked with the diaphragm mechanism in an interchangeable camera objective lens (not shown). Diaphragm interlocking pin 1 is biased by spring 1a in a direction to stop-down the diaphragm and is also adapted to engage control lever 3 when the interchangeable lens is coupled with the camera. Diaphragm aperture control lever 3 is provided with pin 3a, which is received in the open-ended slot of hooked or U-shaped portion 5a of first interlock lever 5. Interlock lever 5 is pivotally interconnected with second interlock lever 7, by pin 7a carried by second interlock lever 7, which in turn is rotatably mounted on shaft 9. Second interlock lever 7 is formed with lug 7b to latch the entire diaphragm aperture control mechanism in a charged position. Second interlock lever 7 further has arm 7c to which one end of spring 11 is connected with the other end thereof connected to arm 3b of diaphragm aperture control lever 3. Thus, a loop moving mechanism is composed of diaphragm aperture lever 3, first interlock lever 5, second interlock lever 7, spring 11 and two shafts 4 and 9. For a more detailed understanding of such loop mechanism, reference is made to, for example, U.S. Pat. Nos. 3,810,216, 3,891,992 and 4,142,787. Arm 7d of second interlock lever 7 is engageable with a reset mechanism, described hereinafter, to return the entire diaphragm aperture control mechanism to its initial condition.

First interlock lever 5 is formed with projection 5b, which cooperates with a subsequently described diaphragm aperture determining mechanism, engageable with abutting end 13a of sector segment gear 13. Sector segment gear 13 is rotatably mounted on shaft 14 and is formed with teethed portion 13b engaging or meshing with teeth 15a of diaphragm aperture determining gear 15. Integrally and coaxially with gear 15 is gear 15b which is engaged by anchor 17 for delaying the rotational operation of gear 15a and accordingly sector segment gear 13. Diaphragm aperture determination gear 15 is also co-rotatable with diaphragm stop gear or ratchet wheel 15c which is engageable with stop lever 21 (to be described later). It should be noted that sector segment gear 13 is biased clockwise by a spring (not shown).

Electromagnetic component Mg2' is of the combination type that contains a permanent magnet to normally attract armature 23a by the magnetic force of the permanent magnet, which magnetic force is counteracted by the electromagnetic force caused by energization of an electromagnetic coil, thereby allowing armature 23a to move by the force of spring 27. For a better understanding of the combination type electromagnet as used herein, reference should be made to allowed U.S. patent application Ser. No. 119,775, now U.S. Pat. No. 4,288,771, assigned to the same assignee as the present invention. Stop lever 21 and movable lever 23 are pivotally mounted on shaft 19, and spring 25, wound around shaft 19, is located between arm 23d of movable lever 23 and eccentric adjusting pin 21a on stop lever 21 to operate both levers in unison. Furthermore, spring 27 is mounted with one end engaging vertically extending portion 21b of stop lever 21 and the other end engaging the stationary portion of the camera body (not shown) so that movable lever 23 and stop lever 21 are integrally rotated counterclockwise when electromagnetic component Mg2' is energized as mentioned above. Stop lever 21 is provided with claw 21c engageable with gear 15c, and carries adjusting pin 21d.

Reset lever 31, being biased clockwise by strong spring 33 is rotatably supported by stud 9. In response to exposure termination, exposure termination signaling lever 35 moves upwardly to rotate lock lever 37 counterclockwise against the force of spring 37a, whereby detent projection 31a of reset lever 31 is released from locking projection 37b of lock lever 37. This allows reset lever 31 to be rotated clockwise by the force of spring 33 acting on pin 31c. Edge 31b of reset lever 31 is engageable with projecting portion 7e of interlock lever 7 when reset lever 31 is returned to a relaxed position. Projecting tab 31d is engageable with mirror reset lever 51 in the aforementioned relaxed position of reset lever 31.

The mechanism shown in the upper part of FIG. 4 is actually located above and overlies the mechanism shown in the lower part of the same Figure and has been separated therefrom solely for purposes of the following description. Release interlock lever 41 and release lever 43 are rotatably mounted on shaft 14 coaxially with sector segment gear 13. Electromagnetic diaphragm release component Mg1' in the form of a solenoid, only part of which is shown in FIG. 4a, is provided with plunger 45 projecting from the solenoid body, i.e., the internal space of the bobbin when the associated electromagnet coil is energized. Plunger 45 is formed with circular shaft 45a which is engaged by a U-shaped or forked end 41a of release interlock lever 41, and the axial length of circular shaft 45a is designed to allow movement of forked end 41a relative to plunger 45 when release interlock lever 41 is overcharged.

Release interlock lever 41 is further provided with release arm 41b which engages release lever 43, abutting edge 41c which is engageable with adjusting pin 21a of stop lever 21, and reset end portion 41d which is engageable with pin 31c of reset lever 31 when reset lever 31 operates. Release interlock lever 41 is also biased counterclockwise by spring 41e. Release lever 43 is always biased clockwise by spring 43d, with upstanding arm 43b being in constant contact with release arm 41b of release interlock lever 41. Locking detent 43c is engageable with lug 7b of interlock lever 7.

With reference to FIG. 5, mirror drive pin 61 is carried by a mirror frame (not shown) which supports reflex mirror M (indicated by a dotted line). Mirror drive lever 63, for driving mirror drive pin 61, is mounted for rotation around stud 69 and is biased clockwise by spring 67. At the stage prior to mirror release, the clockwise rotation of mirror drive lever 63 is blocked by the engagement of upstanding lug 63a with locking detent 71a of mirror lock lever 71, which in turn is rotatably mounted on stud 75. Mirror drive lever 63 is formed with recess 63b engageable with mirror drive pin 61, and carries pin 63d to which one end of mirror reset spring 67 is connected and which engages mirror reset lever 51 along with pin 63c.

Electromagnetic device Mg3' for controlling the mirror movement is identical in structure to diaphragm release electromagnetic device Mg1' (previously described) but has plunger 81 engaged by mirror actuating lever 73 at circular shaft 81a. Mirror actuating lever 73 is pivotally mounted on shaft 75 coaxially with mirror lock lever 71 and is biased counter-clockwise by spring 77. Mirror actuating lever 73 is actuated by plunger 81 which retracts in the solenoid body under the action of a permanent magnet included in electromagnetic device Mg3' when the coil thereof is not energized. Mirror lock lever 71 is formed with locking detent 71a and upstanding lug 71b engageable with mirror release lever 73 as shown in FIG. 5. Mirror reset lever 51 is rotatably mounted on shaft 69 coaxially with mirror drive lever 63, and has operating end 51a engageable with resetting end portion 73a of mirror release lever 73.

With reference to the operation of the diaphragm aperture control mechanism and the mirror release mechanism, an explanation is first made of the case where the exposure is made with any reduced diaphragm aperture, i.e. not a fully open aperture. The following description is taken with respect to FIGS. 1, 2 or 3 and FIG. 4, as well as other Figures specifically identified.

When a power switch (not shown) is turned on in the first stage of shutter release button depression, signals respectively representative of preset film sensitivity SV and intensity of scene light BV-AVO, measured through the fully open aperture, are processed (in accordance with the well-known Apex system of notation and computation) in light measuring circuit LC (FIGS. 1–3) to obtain a signal representative of a shutter speed suitable for such exposure conditions. The shutter speed signal thus obtained is then compared with the signal output from manual shutter speed signal generator circuit SG to determine whether the diaphragm should be left at the fully open aperture or stopped-down. When that comparison reveals that the diaphragm should be stopped-down, diaphragm release circuit MD1 energizes electromagnet coil Mg1, thereby enabling the diaphragm to be stopped-down. More specifically, the energization of coil Mg1 of electromagnetic device Mg1' (FIG. 4) counteracts the magnetic force of the permanent magnet of the same means to free plunger 45, whereby release interlock lever 41 is retracted by the force of spring 41e to the position shown in FIG. 7. This causes release lever 43 to be rotated counterclockwise by the engagement between release arm 41b of release interlock lever 41 and upstanding arm 43b of release lever 43 against the force of spring 43a, whereby lug 7b is released from interlocking with locking detent 43c. Diaphragm aperture control lever 3 is, therefore, driven counterclockwise by spring 11 of the loop moving mechanism through second interlock lever 7 and first interlock lever 5. Under the force of spring 1a, diaphragm interlock pin 1 follows diaphragm aperture control lever 3 to gradually stop-down the diaphragm in the interchangeable objective lens. At this moment, the rotation of diaphragm aperture control lever 3 forces sector segment gear 13 to rotate, by engagement of abutting end 13a with projection 5b of first interlock lever 5, and sector segment gear 13 rotates diaphragm aperture determination gear 15.

Figure 7:
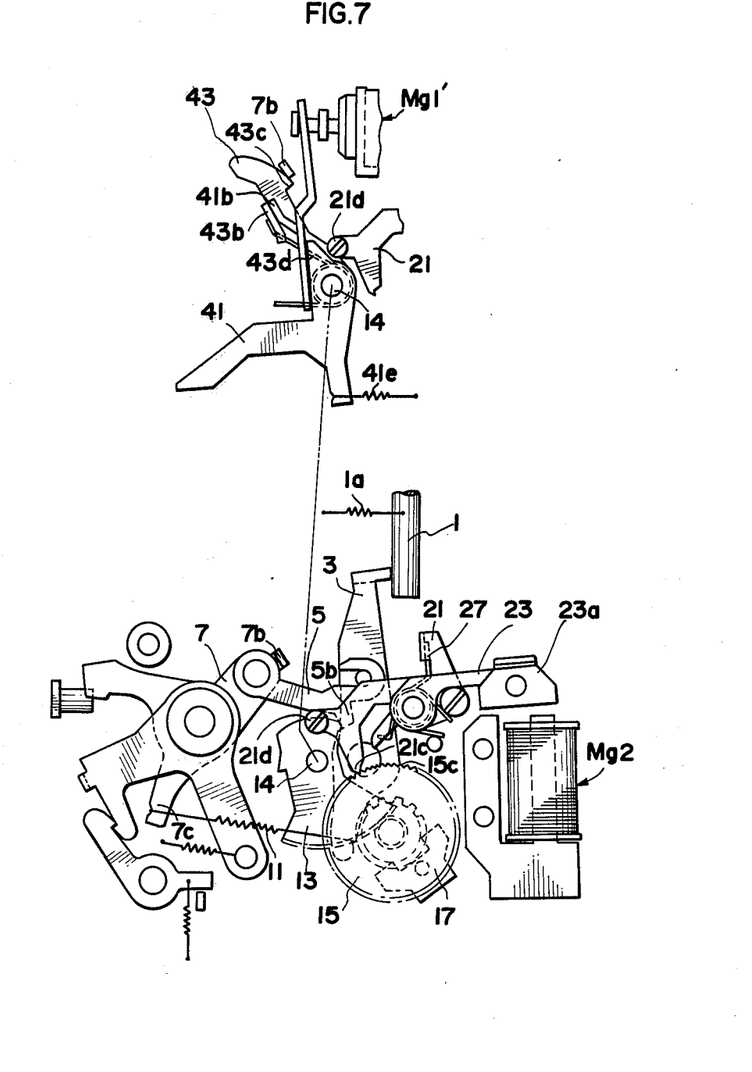
FIGS. 7 and 8 show the same mechanism as that in FIG. 4 but in the condition after diaphragm determination and upon the completion of restoring the diaphragm control mechanism to an initial state, respectively.

The rotation of diaphragm aperture determination gear 15 is retarded by the cooperation of anchor 17 and gear 15b. While the diaphragm is being stopped-down the scene brightness is measured through the aperture of the diaphragm. When the scene light measurement reaches a predetermined level relative to the preset shutter speed and film sensitivity, a diaphragm stop signal is produced by diaphragm determination circuit MD2 as previously described. The diaphragm stop signal is applied to electromagnet coil Mg2 (FIGS. 1-3) in the form of a current pulse. With reference to FIG. 7, the magnetic force of the permanent magnet in electromagnetic device Mg2' is counteracted by the electromagnetic force of the coil offset, allowing the movement of adjusting pin 21d of stop lever 21 which has been released from restraint by release interlock lever 41 due to the retraction of the latter from adjusting pin 21d. Then, stop lever 21 and movable lever 23 are rotated counterclockwise by the force of spring 27. When claw 21c of stop lever 21 engages ratchet wheel 15c of diaphragm aperture determination gear 15, the rotation of gear 15 is immediately stopped. The stopping of diaphragm aperture determination gear 15 simultaneously stops the movement of diaphragm aperture control lever 3, thereby causing the upward movement of diaphragm aperture control interlock pin 1 to be immediately stopped, so that the diaphragm aperture is determined. Rotation of eccentric pin 21a on stop lever 21 adjusts the space between claw 21c and diaphragm stop gear 15c such that the time loss and time lag caused by, or associated with, the diaphragm stop operation is minimized. Similarly eccentric adjusting pin 21d may be turned to adjust the position where it abuts against edge 41c such that release interlock lever 41 pushes pin 21d and presses armature 23a against the magnetic pole of electromagnetic device Mg2' compressing spring 27 in the final stage of the diaphragm control mechanism restoring or returning operation.

The diaphragm aperture determination is followed by the retraction of mirror M as described with reference to FIG. 5. Third electromagnetic device Mg3' for mirror actuation is energized after the lapse of an appropriate period of time from the generation of the diaphragm aperture determination signal as previously described. This energization counteracts the magnetic force of a permanent magnet of third electromagnetic device Mg3', whereby plunger 81, which has been attracted to the permanent magnet, is allowed to move. As a result, mirror release lever 73, the rotation of which has been blocked by plunger 81, is rotated counterclockwise by the force of spring 77. Mirror lock lever 71 is coaxially mounted with mirror release actuating lever 73 and is driven thereby with projecting lug 71b being pushed and is rotated counterclockwise by mirror release lever 73 against the force of spring 71c. Mirror drive lever 63, which has been locked by locking detent 71a of locking lever 71, is then rotated clockwise by the force of spring 67 to push mirror drive pin 61 upward by the engagement of recessed edge 63b, whereby mirror M is retracted from the photographic optical path in a manner known to those skilled in the camera art.

Figure 8:
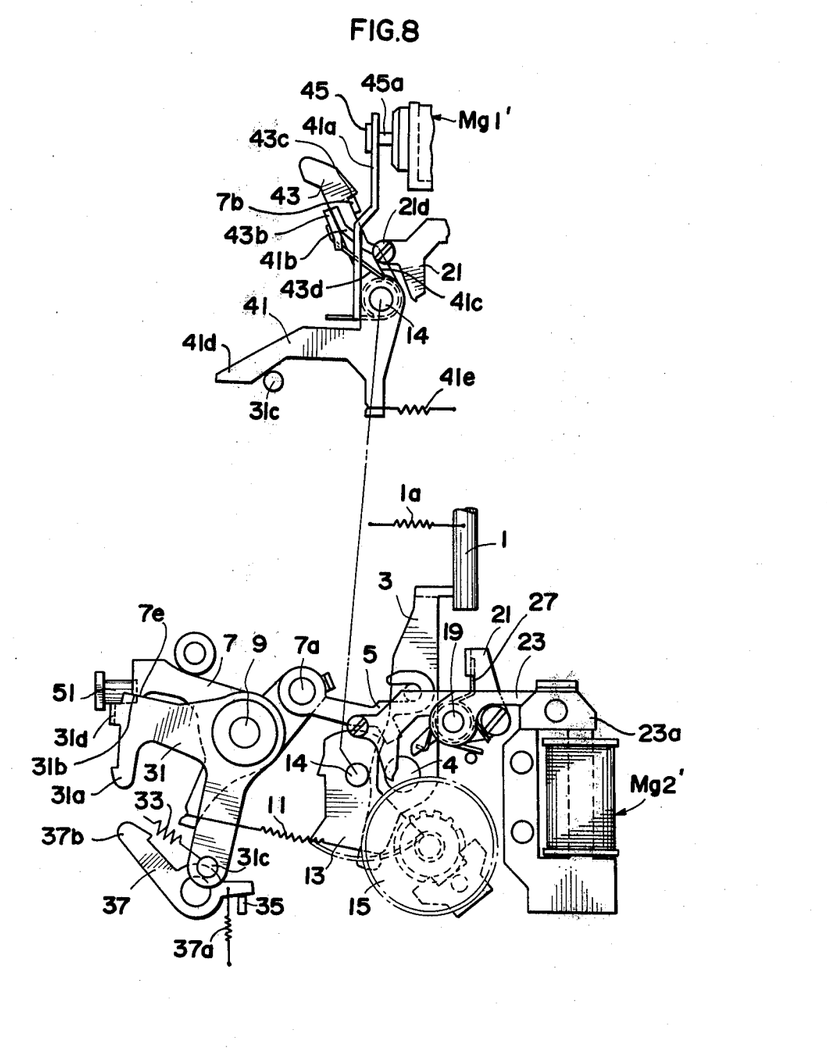

The diaphragm aperture determination and mirror retraction operations, as described above, are followed by actuation of a shutter mechanism (not shown) wherein, for example, a leading shutter curtain travels to being film exposure. In response to exposure termination, exposure termination signaling lever 35 (shown in FIG. 8) is displaced upwardly thereby rotating locking lever 37 counterclockwise against the force of spring 37a to disengage locking finger 37b from locking detent 31a of reset lever 31. Therefore, reset lever 31 is rotated clockwise by the force of spring 33 on pin 31c and side edge 31b of reset lever 31 abuts against side edge 7e of second interlock lever 7 and forces the latter clockwise. Subsequently, components constituting the previously described loop moving mechanism together with second interlock lever 7, i.e., first interlock lever 5, spring 11 and diaphragm aperture control lever 3, are respectively returned to the initial or ready position shown in FIG. 4. During that returning operation (as shown in FIG. 8), pin 31c carried by reset lever 31 pushes arm 41d of release interlock lever 41, which in turn rotates clockwise around stud 4 against the force of spring 41e, thereby retracting forked end 41a from the enlarged head of plunger 45. As a result, plunger 45 is attracted back into electromagnetic device Mg1' by the magnetic force of the permanent magnet. In the meantime, side edge 41c of release interlock lever 41 pushes adjusting pin 21d of stop lever 21 so that stop lever 21 and movable lever 23 are integrally rotated clockwise about shaft 19 to their initial positions shown in FIG. 4, thereby pressing movable armature 23a against the magnetic pole of diaphragm stop electromagnetic device Mg2' with the force of spring 27 being compressed and overcharged, thereby forming a gap between pin 21a and lever 23 (not shown). The amount of the overcharge, i.e., the gap formed at this time is adjustable by the rotation of eccentric adjusting pin 21d as described before. Release lever 43 is rotated clockwise, by the force of spring 43d, following release interlock lever 41 with release arm 41b moving away from projecting arm 43b by the clockwise rotation of release interlock lever 41. Lug 7b of second interlock lever 7 again engages locking detent 43c of release lever 43.

With diaphragm aperture control lever 3 reset, lens diaphragm interlock pin 1 is reset to its initial position against the action of spring 1a so that the diaphragm aperture is fully open.

Furthermore, when reset lever 31 (provided on the bottom under wall of the mirror box) is rotated counterclockwise, projecting tab 31d of reset lever 31 (see FIG. 8) engages and pushes back mirror reset lever 51 (mounted on the side wall of the mirror box) counterclockwise about shaft 69 by the force of spring 33. Mirror drive lever 63 is turned counterclockwise by the engagement of side edge 51b of mirror reset lever 51 with pin 63c of mirror lever 63 against the force of spring 67 (see FIG. 5). This causes reset spring 65 to be turned counterclockwise about stud 69 by pin 63c, whereby mirror drive pin 61 is urged downwardly. Reset spring 65 is turned both clockwise and counterclockwise integrally with mirror lever 63 to cause the upward and downward movement of mirror drive pin 61. Projecting lug 63a of mirror drive lever 63 then engages locking detent 71a of mirror locking lever 71, whereby mirror M is blocked from being retracted (lifted with respect to FIG. 5). Arm 51a of reset lever 51 rotates mirror release actuating lever 73 clockwise about shaft 75 by the engagement with arm 73a against the force of spring 77, thereby allowing plunger 81 to be reset to an initial retracted condition wherein it is attracted by the permanent magnet of electromagnetic device Mg3'. Mirror actuating lever 73 is rotated slightly beyond the initial position shown in FIG. 5 to ensure the attraction of plunger 81 by the permanent magnet and the excess movement is enabled by the axial space under the head of plunger 81.

With a series of the above operations, all the movements relates to photography are completed. With the film advanced by a known wind-up mechanism for subsequent photography, reset lever 31 is rotatedcounterclockwise (from the position shown in FIG. 8) about shaft 9 with pin 31c tensioning spring 33 until locking detent 31a engages locking projection 37b of locking lever 37 as shown in FIG. 4. With that operation, all the previously described mechanisms are reset to their initial condition.

The following describes the operation of the electrical circuitry and mechanical components when exposure is controlled with a fully open diaphragm aperture. When upon release operation the output of light measuring circuit LC (FIGS. 1-3) is such that the exposure should be made with the diaphragm aperture fully open, diaphragm aperture control mechanism AC, shown in detail in FIG. 4, is not provided with the release signal. As previously described with respect to the circuit block diagrams of FIGS. 1 to 3, AND gate G1 is blocked and electromagnet coil Mg1 is not energized and diaphragm actuating electromagnetic device Mg1' is not operated such that the diaphragm aperture control system remains inoperative. Therefore, interlock pin 1 of the camera objective remains at the fully open position, leaving the diaphragm fully open. However, a release signal is applied from delay circuit DL1 (FIG. 1) or OR circuit G4 (FIGS. 2 or 3) to mirror actuation circuit Md3 to excite electromagnet coil Mg3 and initiate the mirror release operation. The mirror release operation then proceeds in the manner previously explained such that repetitious description thereof is omitted.

The mirror release operation is followed by shutter release and film exposure to complete photography. After completion of photographic exposure, exposure termination signaling lever 35 operates to release reset lever 31 from the locked condition thereof so that reset lever 31 is rotated clockwise by the force of spring 33. The clockwise rotation of reset lever 31 and the resetting operation of the mirror system are also as described above such that no additional explanation thereof is necessary.

Figure 9:
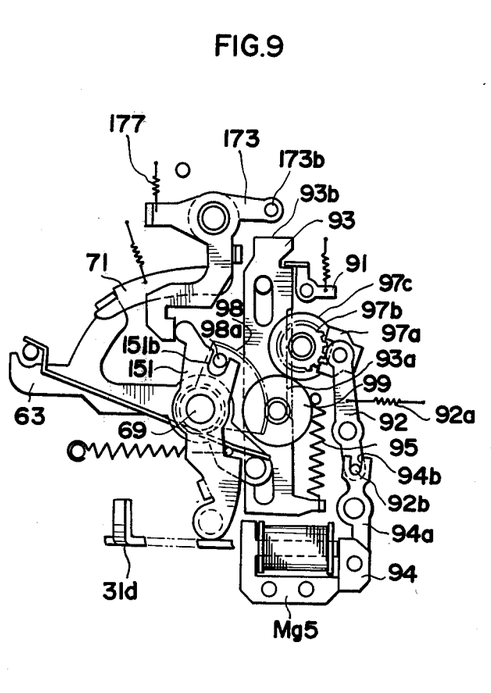
FIG. 9 is a plan view of another embodiment of the mirror driving mechanism wherein the mirror actuation is mechanically and selectively delayed.

FIG. 9 shows another embodiment of apparatus which employs a mechanical governor or retarding mechanism for delaying the mirror release or retraction operation. The mechanical governor includes delay control plate 93 which is biased upwardly by the force of spring 95 and is arrested by release lever 91. The movement of delay control plate 93 is retarded by a governor mechanism including rack 93a formed on the control plate and gear 97b co-rotatable therewith and engageable by escapement member 97a. Gear 97c is interconnected with mirror reset lever 151 through gear 99 and sector segment gear 98 which carries pin 98a received in open-ended slot 151b of lever 151.

Escapement holder 92 pivotally carries escapement 97a and is biased by spring 92a in a direction to retract escapement member 97a away from gear 97b. Armature 94 of delay control electromagnetic device Mg5 is pivotally mounted on armature lever 94a which is linked with escapement holder 92 through forked end 94b and pin 92b received thereby. As shown in FIG. 9 prior to photographic delay control, electromagnetic device Mg5 attracts armature 94 by the magnetic force of a permanent magnet included in electromagnetic device Mg5, which is constructed similar to previously described electromagnetic devices Mg1', Mg2' and Mg3'.

In response to the shutter release operation, release lever 91 is rotated clockwise to release delay control plate 93 from its locked or arrested condition, and delay control plate 93 then moves upwardly by the force of spring 95. The delay control mechanism is thereby actuated by the turning of mirror reset lever 151 through gears 97, 99, sector segment gear 98 and pin 98a. Simultaneously therewith, gear 97c is braked by escapement member 97a, whereby delay control plate 93 moves upwardly at slow speed until release end 93b thereof engages and pushes pin 173b of mirror release lever 173 to rotate the latter counterclockwise against the force of spring 177. This causes counterclockwise rotation of mirror locking lever 71 to release mirror drive lever 63, which in turn rotates clockwise and swings up or retracts mirror M (not shown). The operations thereafter are identical to that as described above with respect to the preceding embodiments and a further description thereof is omitted as being unnecessary to an understanding of this aspect of the invention.

Upon exposure termination, mirror reset lever 151 is rotated counterclockwise by projecting finger 31d of reset lever 31, whereby delay control plate 93 is lowered, by the rotation of mirror reset lever 151 through pin 98a on sector segment gear 98, sector segment gear 98 and gears 97 and 99, to an initial position as shown in FIG. 9.

In the case where the diaphragm aperture is to be left fully open, by the diaphragm aperture control mechanism remaining inoperative, the mirror actuating mechanism is operated by the shutter release operation. In the embodiment of FIG. 9, when release lever 91 is rotated by the shutter release operation, delay control plate 93 is unlocked for movement. A signal to enable the diaphragm aperture to be fully open, e.g. logic "1" signal from comparator CP (FIGS. 1-3), is input to delay release electromagnetic device Mg5 almost simultaneously with the unlocking of delay control plate 93, whereby electromagnetic device Mg5 is energized to counteract the magnetic force of the permanent magnet thereof. As a result, armature lever 94a and escapement holder 92 rotate in opposite directions by the force of spring 92a. When escapement holder 92 is rotated, escapement member 97a is disengaged from escape gear 97b to unload delay control plate 93, which moves upwardly rapidly by the force of spring 95 without being braked, thereby pushing mirror release lever 173 upwardly. The mirror is lifted thereafter in the same manner as described above.

Although the invention has been described in its preferred forms with a certain degree of particularity, it is understood that one of ordinary skill in the camera art will recognize changes in the details of construction and operation of the invention and that the resulting combination and arrangement of the component elements may be resorted to without departing from the spirit and the scope of the invention as hereinafter claimed.

For example, the film sensitivity signal which is coupled with the light measurement signal in light measuring circuit LC in the embodiments shown in FIGS. 1 to 3, may, instead, be coupled with the manual shutter speed signal from slider W to provide a reference level for the comparison with the light measurement signal. Furthermore, the circuitry may be modified such that the combination of the light measurement signal and the manual shutter speed signal is compared with the film sensitivity signal. Such combinations and comparisons may be made in accordance with well-known exposure calculation principles represented by simple addition or subtraction formula defined by the well-known Apex system.

The inventor desires that the elements recited in the following claims be accorded their full equivalents such that the invention is accorded the full scope of coverage afforded by such interpretation.

What is claimed is:

1. A camera, comprising diaphragm aperture means normally fully open and adapted to be stopped-down in response to a camera actuating operation;
   - means for initiating a stopping-down operation of said diaphragm aperture means;
   - light measuring means for receiving scene light through the diaphragm aperture and generating a light measurement signal as a function of the received light;
   - means for generating a reference signal as a function of at least one manually set exposure parameter;
   - means for comparing said light measurement signal with said reference signal to generate a comparison signal;
   - control means coupled with said comparing means for generating a control signal when the light measurement signal generated before the initiation of said diaphragm stopping-down operation is of a value, with respect to said reference signal, requiring a fully open diaphragm aperture;
   - means for determining said diaphragm aperture in accordance with the comparison signal generated with said diaphragm means being stopped-down; and
   - means for preventing the operation of said initiation means in response to said control signal.

2. A diaphragm control device as claimed in claim 1 wherein said means for generating a reference signal includes means for generating a manual shutter speed signal commensurate with a manually set shutter speed.

3. A diaphragm control device as claimed in claim 2 wherein said comparison means receives a film sensitivity value, said manual shutter speed signal, and said light measurement signal to detect the level of the light measurement signal with respect to the combination of the film sensitivity value and said manual shutter speed signal.

4. A diaphragm control device as claimed in claim 3 wherein said light measuring means further includes means for calculating and generating a light related shutter speed signal from said light measurement signal and said set film sensitivity, and said comparison means compares said light related shutter speed signal with said manual shutter speed signal.

5. A single lens reflex camera, comprising:
   - an interchangeable objective lens with a diaphragm aperture means;
   - a diaphragm driving mechanism for normally setting the diaphragm aperture fully open and stopping-down the same in response to a camera actuating operation, and a reflex mirror retractable from a viewing to a photographic position;
   - initiation means for initiating a stopping-down operation of said diaphragm aperture means;
   - light measuring means for receiving scene light through the diaphragm aperture and generating a light measurement signal as a function of the received light;
   - means for generating a reference signal as a function of at least one manually set exposure parameter;
   - means for comparing said light measurement signal with said reference signal to generate a comparison signal;
   - control means coupled with said comparing means for generating a control signal when the light measurement signal generated before the initiation if said diaphragm stopping-down operation is of a value, with respect to said reference signal, requiring a fully open diaphragm aperture;
   - means for determining said diaphragm aperture in accordance with the comparison signal generated with said diaphragm means being stopped-down;
   - means for preventing the operation of said initiation means in response to said control signal;
   - mirror actuation means for initiating the retraction of said reflex mirror; and
   - delay means for actuating said mirror actuation means after lapse of a given time from the camera actuating operation.

6. The single lens reflex camera as claimed in claim 5 further comprising means for actuating said mirror actuation means in response to said control signal immediately after the camera actuating operation.

7. The single lens reflex camera as claimed in claim 6 further comprising a second delay means for actuating said mirror actuation means after lapse of a predetermined time from the diaphragm determination.

8. The single lens reflex camera as claimed in claim 5 wherein said means for generating a reference signal includes means for generating a manual shutter speed signal commensurate with a manually set shutter speed, and said light measuring means further includes means for calculating and generating a light related shutter speed signal from said light measurement signal and a set film sensitivity, and said comparison means compares said light related shutter speed signal with said manual shutter speed signal.

9. The single lens reflex camera as claimed in claim 8 further comprising means for controlling exposure time in accordance with the light related shutter speed signal generated after the diaphragm determination.

10. The single lens reflex camera as claimed in claim 5 wherein said first delay means includes a mechanical governor.

* * * * *